United States Patent [19]

Marchetti

[11] Patent Number: 4,899,179

[45] Date of Patent: Feb. 6, 1990

[54] NOZZLE SUPPORT HEAD FOR INK-JET MARKING DEVICES

[76] Inventor: Augusto Marchetti, Piazza Sicilia, 7, 20146 Milano, Italy

[21] Appl. No.: 312,944

[22] Filed: Feb. 21, 1989

[30] Foreign Application Priority Data

Feb. 29, 1988 [IT] Italy ............................... 19579 A/88

[51] Int. Cl.[4] ........................ G01D 15/18; B05B 15/06

[52] U.S. Cl. .................................... 346/140 R; 248/89

[58] Field of Search ................. 346/75, 140 R, 140 IJ, 346/140 PD; 248/89

[56] References Cited

U.S. PATENT DOCUMENTS 4,112,436 9/1978 Cone ............................... 346/140 IJ 4,224,627 9/1980 Powell et al. .......................... 346/75

4,429,848 2/1984 Gunsolus .............................. 248/89

*Primary Examiner*—George H. Miller, Jr.

*Attorney, Agent, or Firm*—Cushman, Darby & Cushman

[57] ABSTRACT

The head is accomplished in two superimposed pieces which can be fastened and released. The two pieces mate along respective faces provided with respective successions of notches, preferably triangular, which together with the corresponding notches in the mating face of the other piece define a succession of holes to receive respective ink atomizers. Sealing means are preferably provided to take up the transverse clearances between atomizers and the holes in which they are housed.

5 Claims, 2 Drawing Sheets

NOZZLE SUPPORT HEAD FOR INK-JET MARKING DEVICES

DESCRIPTION

The present invention refers to a nozzle support head for ink-jet marking devices.

Ink-jet marking devices represent a recent development in the field of marking of containers of different types, in particular cardboard cases.

By avoiding direct contact with the container, such marking devices provide the certainty of obtaining uniform and readable markings, whose height may vary within wide limits while the width may be set by the operator himself by adjusting the spraying rate of the ink in relation to the rate of movement of the container to be marked.

In the currently known ink-jet markers the support head is accomplished in a single piece traversed by a succession of parallel holes, in each of which a respective atomizer constituted by an ink feed pipelet and by a terminal nozzle is forcefully inserted from opposite ends in said hole.

There is thus the drawback that if an atomizer deteriorates and must be replaced the entire head must also be replaced.

Moreover the operation required for assemblying the atomizers is rather difficult and complicated and can lead to the deformation of the nozzles. In addition the feed pipelets do not always attain contact with the nozzles, inserted in the respective holes from opposite ends.

The object of the present invention is now to accomplish a nozzle support head for ink-jet (or similar liquid) marking devices, which does not exhibit the above drawbacks and in particular allows an easy and quick assemblying and dismantling of the atomizers which, if necessary, may be replaced even one at a time.

According to the invention such object is attained by a nozzle support head characterized in that it is accomplished in two superimposed pieces which can be fastened and released, mating along respective faces provided with respective successions of notches which together with the corresponding notches in the mating face of the other piece define a succession of holes to receive the respective ink atomizers.

Sealing means are in addition preferably provided housed in one of said pieces and partially housed in the notches of said piece to urge said atomizers against the opposite wall of the notches of the other piece to take up the transverse clearance between said atomizers and said holes.

With the head according to the invention the assemblying and dismantling of the atomizers is clearly easy and quick, as it is sufficient to separate momentarily the two pieces of the head and then clamp them together again with the interposed seal, if any.

In this way it is thus also possible and appropriate to insert the nozzles into the respective feed pipelets before they are fastened to the head, so that the current problems relates to the initial deterioration of the nozzles and to the imperfect mating between nozzles and pipelets are overcome.

An example of an embodiment of the head according to the invention is illustrated for greater clarity, but without any limiting intention, in the enclosed drawings, in which.

Figure 1:
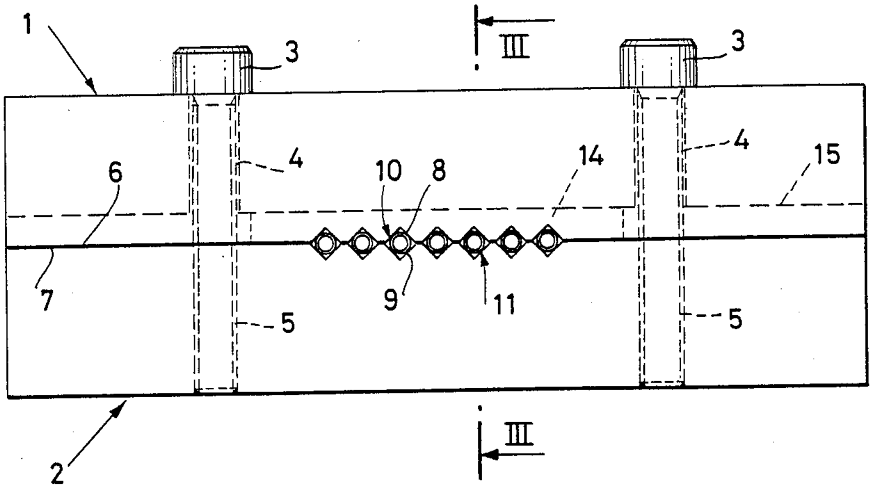
FIG. 1 shows a front view of a head according to the invention.
Figure 2:
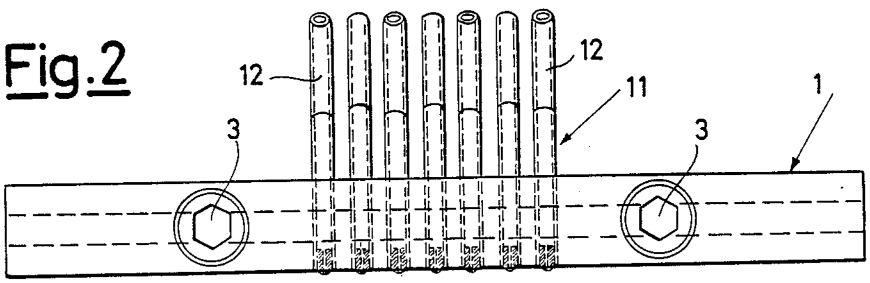
FIG. 2 shows a top plan of said head.

The head illustrated in the drawings is made up of two prismatic parts with a rectangular section 1 and 2, for example of drawn brass, superimposed on one another and fastened together by means of bolts 3 engaged in aligned holes 4 and 5 of the two parts.

Figure 5:
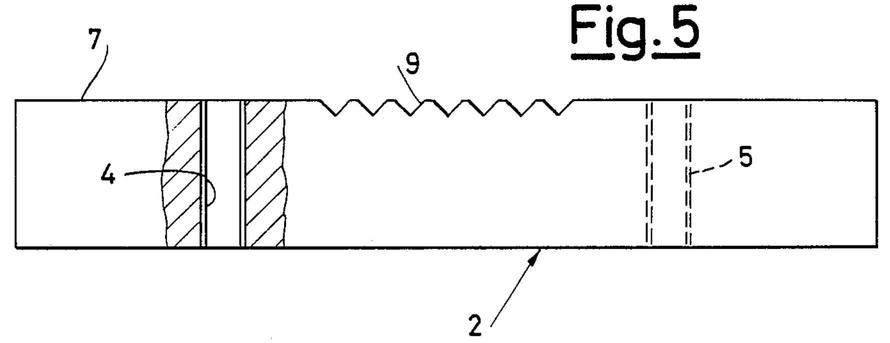
FIG. 5 shows a front view of the other of the two pieces which constitute the head of FIGS. 1–3.
Figure 6:
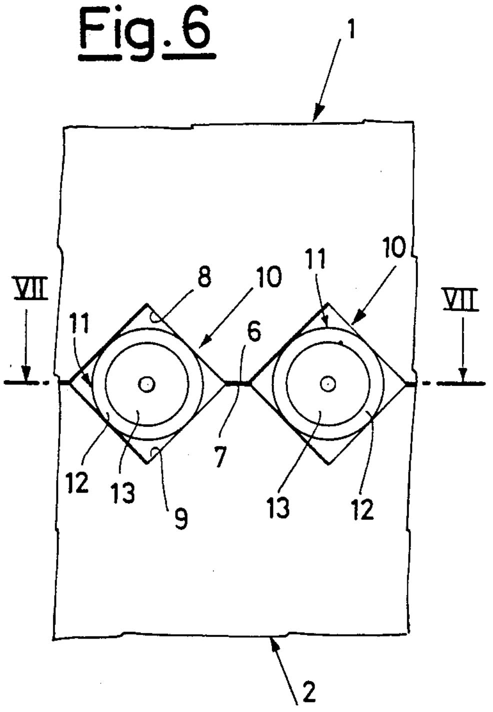
FIG. 6 shows a front view of an enlarged detail of the head of FIG. 1.

The two parts 1 and 2 mate along the respective flat faces 6 and 7, each of which (FIGS. 4 and 5) has a respective succession of approximately triangular notches 8 and 9 with a 90° angle at the vertex, which when the parts 1 and 2 are assembled define between them a succession of approximately square holes 10 visible in FIG. 1 and, in an enlarged scale, in FIG. 6.

Figure 7:
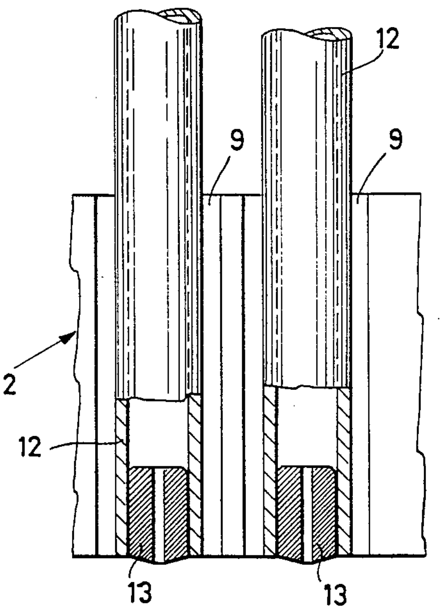
FIG. 7 shows an enlarged detail of FIG. 6 sectioned along the line VII—VII of the same figure.

In each of said holes 10 there is a respective atomizer for ink (or similar liquid) 11 formed by a metal pipelet 12 and by a nozzle 13, of ruby or other precious stone, forcefully inserted in the end of the pipelet 12 (FIG. 7).

Figure 3:
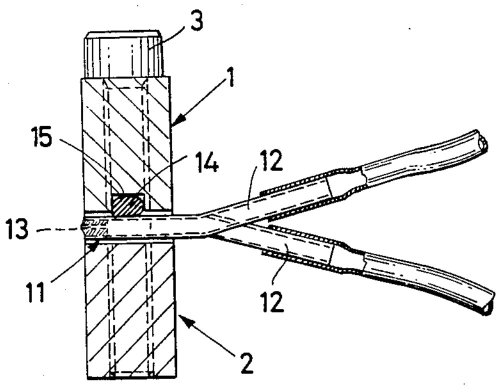
FIG. 3 shows said head sectioned transversally along the line III—III of FIG. 1.

The atomizers 11 are locked in the respective holes 10 by means of a seal 14 accomplished in the form of a small rubber bar, which is housed in a longitudinal mill cut 15 of the part 1 and protrudes partially inside the notches 8 of the same piece 1 so that the atomizers 11 are pushed yieldably against the opposite wall of the notches 9 of the part 2 (FIGS. 1, 3 and 6).

There is thus accomplished an appropriate take up of the clearance between the mill cuts of the notches 8 and 9 and the circumference of the pipelets 12.

Figure 4:
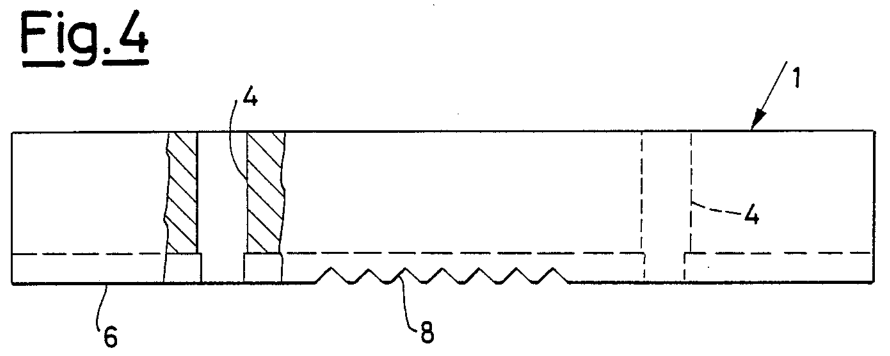
FIG. 4 shows a front view of one of the two pieces which constitute the head of FIGS. 1–3.

It is obvious that for the assembly of the atomizers 11, and also for their replacement in case of deterioration, it is sufficient to separate the head in the two parts 1 and 2 shown in FIGS. 4 and 5 and then reassemble them on the atomizers 11 before inserting the seal 14.

I claim:

1. Nozzle support head for ink-jet marking devices, characterized in that it is accomplished in two superimposed pieces which can be fastened and released, mating along respective faces provided with respective successions of notches which together with the corresponding notches in the mating face of the other piece define a succession of holes to house respective ink atomizers.

2. Nozzle support head according to claim 1, characterized in that it includes sealing means housed in one of said pieces and partially housed in the notches of said piece to urge said atomizers against the opposite wall of the notches of the other piece in order to take up the transverse clearance between said atomizers and said holes.

3. Nozzle support head according to claim 1, characterized in that said notches have an approximately triangular section.

4. Nozzle support head according to claim 3, characterized in that said approximately triangular notches have an angle at the vertex which is substantially equal to 90°.

5. Nozzle support head according to claim 1, characterized in that said sealing means are accomplished in the form of a small rubber bar housed in a longitudinal mill cut on one of said parts of the head.

* * * * *